(No Model.)
A. JAHONT.
WOODEN HANDLE FOR TEA AND COFFEE POTS.
No. 309,060. Patented Dec. 9, 1884.
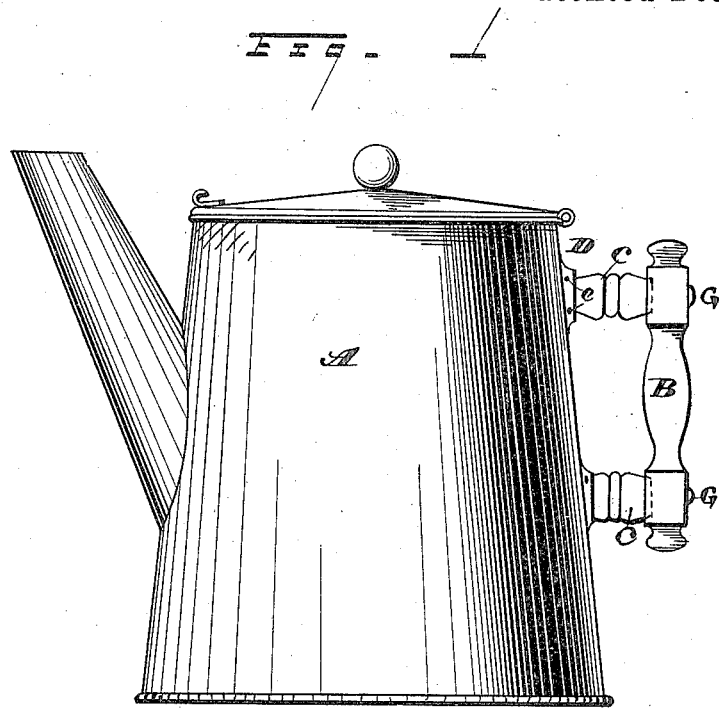
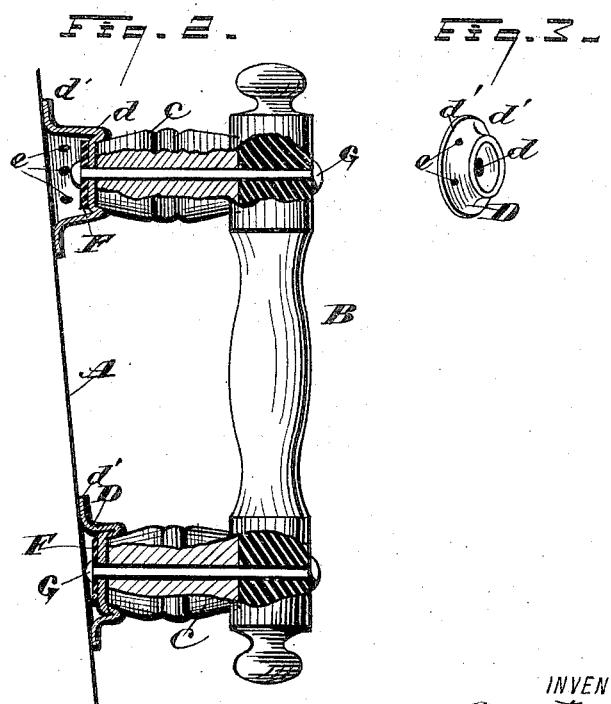
WITNESSES
Wm. H. Monroe.
Geo. W. King
INVENTOR
Augustus Jahont
by Leggett & Leggett,
Attorneys

UNITED STATES PATENT OFFICE.

AUGUSTUS JAHONT, OF AKRON, OHIO.

WOODEN HANDLE FOR TEA AND COFFEE POTS.

SPECIFICATION forming part of Letters Patent No. 309,060, dated December 9, 1884.

Application filed April 8, 1884. (No model.)

*To all whom it may concern:*

Be it known that I, AUGUSTUS JAHONT, of Akron, in the county of Summit and State of Ohio, have invented certain new and useful Improvements in Wooden Handles for Tea and Coffee Pots; and I do hereby declare the following to be a full, clear, and exact description of the invention, such as will enable others skilled in the art to which it pertains to make and use the same.

My invention relates to improvements in wooden handles designed more especially for tea-pots and coffee-pots, the object being to provide a wooden handle supported by wooden arms, that in turn are secured in sockets in metal supports that are attached to the vessel, and with air-chambers between the end of the arm and the vessel, to the end that the handle will not be overheated with ordinary usage. A further object is to provide a serviceable handle at a small initial cost.

With these objects in view my invention consists in certain features of construction and in combination of parts, hereinafter described, and pointed out in the claims.

In the accompanying drawings, Figure 1 is an elevation of a coffee-pot with my improved handle attached. Fig. 2 is an enlarged vertical section of the handle. Fig. 3 is a view in perspective of the metal attachment by which the arms are secured to the vessel.

A represents a coffee-pot; B, the handle, made of wood; and C, the wooden arms that support the handle. The handle has holes of suitable size, forming sockets that receive the ends of the arms, and the other ends of the arms engage, respectively, sockets $d$, formed on the metal pieces D. These pieces may be of cast metal, or may be pressed from thin metal sheets, and have a flange, $d'$, that is soldered or riveted to the vessel. The body of the part D projects far enough to leave an air-chamber back of the socket that receives the arms, and small air-holes $e$ are provided, so that the air is not confined in these chambers. A washer, F, is placed next to the bottom of the socket $d$, as shown, to strengthen the parts, and a rivet, G, passes through the washer, the bottom of the socket, the arm, and handle, firmly securing the parts, after which the flanges $d$ are secured to the vessel. The wooden parts are preferably japanned, to give them a better finish and to protect the wood from the heat when the vessel is set on a hot stove.

These handles may be made at a small initial cost, and will not become so heated with ordinary usage but that they may be handled with comfort.

I am aware that non-conducting handles, and also handle-supports provided with air-chambers, are not broadly new, and hence make no broad claim thereto; but

What I claim is—

1. A wooden handle for a tea-pot or coffee-pot, supported by wooden arms that enter sockets in the handle and in the metal supports by which they are secured to the vessel, substantially as set forth.

2. A wooden handle for a tea or coffee pot, supported by wooden arms that enter sockets in the metal supports that are secured to the vessel, and the said metal supports provided with an air-chamber between the arm and vessel, and perforations leading thereto, and the parts fastened together by rivets, as shown.

3. A wooden handle for tea or coffee pots, supported by wooden arms that are secured in sockets in the handle and in the metal supports that are secured to the vessel, and the metal supports re-enforced at the base of the sockets by a washer, and the parts secured by rivets, substantially as described.

In testimony whereof I sign this specification, in the presence of two witnesses, this 31st day of March, 1884.

AUGUSTUS JAHONT.

Witnesses:
A. C. VORIS,
EDWIN F. VORIS.